US 8,166,135 B2

(12) United States Patent
Ganesh et al.

(10) Patent No.: US 8,166,135 B2
(45) Date of Patent: Apr. 24, 2012

(54) METHOD AND SYSTEM FOR ASSESSING AND REMEDYING ACCESSIBILITY OF WEBSITES

(75) Inventors: Jai Ganesh, Karnataka (IN); Navin Kasa, Andhra Pradesh (IN); Shaurabh Bharti, Bihar (IN); Srinivas Padmanabhuni, Karnataka (IN); Mayank Mathur, Uttar Pradesh (IN); Ajay Kolhatkar, Maharashtra (IN); Shrirang Prakash Sahasrabudhe, Maharashtra (IN)

(73) Assignee: Infosys Technologies Limited (IN)

( * ) Notice: Subject to any disclaimer, the term of this patent is extended or adjusted under 35 U.S.C. 154(b) by 245 days.

(21) Appl. No.: 12/617,892

(22) Filed: Nov. 13, 2009

(65) Prior Publication Data
US 2010/0131797 A1    May 27, 2010

(30) Foreign Application Priority Data
Nov. 24, 2008   (IN) ............................ 2909/CHE/2008

(51) Int. Cl.
*G06F 15/16* (2006.01)
(52) U.S. Cl. ....................................................... 709/219
(58) Field of Classification Search ................... 709/219
See application file for complete search history.

(56) References Cited

U.S. PATENT DOCUMENTS

| | | | | |
|---|---|---|---|---|
| 6,895,551 B1 * | 5/2005 | Huang et al. | ................... | 715/205 |
| 7,216,256 B2 * | 5/2007 | Sankaran et al. | ............... | 714/27 |
| 7,363,364 B2 * | 4/2008 | Sankaran et al. | ............. | 709/223 |
| 7,426,556 B2 * | 9/2008 | Sankaran et al. | ............. | 709/223 |
| 7,526,678 B2 * | 4/2009 | Sankaran et al. | ................ | 714/27 |
| 7,725,407 B2 * | 5/2010 | Bronstad et al. | .................. | 706/1 |
| 7,783,604 B1 * | 8/2010 | Yueh | ............................ | 707/640 |
| 7,809,823 B2 * | 10/2010 | Sankaran et al. | ............. | 709/223 |
| 7,827,271 B2 * | 11/2010 | Sankaran et al. | ............. | 709/223 |
| 7,873,872 B1 * | 1/2011 | Shillington et al. | .......... | 717/124 |
| 7,917,808 B2 * | 3/2011 | Sankaran et al. | ............... | 714/27 |
| 8,015,453 B2 * | 9/2011 | Lee et al. | ..................... | 714/47.1 |
| 2002/0156799 A1 * | 10/2002 | Markel et al. | ................. | 707/202 |

* cited by examiner

*Primary Examiner* — Jerry Dennison
(74) *Attorney, Agent, or Firm* — Cantor Colburn LLP

(57) ABSTRACT

A system and method for assessing and remedying accessibility of websites is provided. The method includes receiving a website address for assessment, an accessibility guideline and level of assessment to be performed from the user. The method further includes crawling the website for extracting information. The information comprises HTML tags used in designing a webpage. Thereafter, the website is scanned for checking conformance to one or more accessibility parameters. Finally, one or more assessment reports are provided to the user.

27 Claims, 15 Drawing Sheets

| HTML Element | Priority Level 1 | Priority Level 2 | Priority Level 3 | Total Breakpoints |
|---|---|---|---|---|
| Input | 0 | 2 | 22 | 24 |
| Select | 0 | 0 | 8 | 8 |
| Anchor | 0 | 169 | 358 | 527 |
| Image | 32 | 0 | 0 | 32 |
| Table | 1 | 0 | 0 | 1 |
| Total | 33 | 171 | 388 | 592 |

SECTION 3

METHOD AND SYSTEM FOR ASSESSING AND REMEDYING ACCESSIBILITY OF WEBSITES

FIELD OF INVENTION

The present invention relates generally to the field of web accessibility. More particularly, the present invention provides for assessing and remedying accessibility of websites.

BACKGROUND OF THE INVENTION

With advances in technology, information has become accessible via various resources. Papers have now been replaced with electronic documents that can be accessed using websites on the Internet or the World Wide Web. However, websites need to serve users regardless of their physical and psychological backgrounds. People who are disabled or differently-abled should be able to access information on the Internet without any difficulties. Web accessibility is the practice of developing websites that are easily accessible by people of different abilities or by people having disabilities.

People with disabilities include people having blindness, deaf or hard of hearing users, low-vision users, color blind users, users with motor disability impairing use of a keyboard or mouse, and users with cognitive disabilities. Challenges faced by disabled people include, inability of visually challenged users to read images, inability of hearing impaired users to access audio, inability of monochrome device users to differentiate between colors, and inability of old people to read small font text. Further, since a lot of Internet use nowadays relate to access and utilization of entertainment content, websites are generally designed using audio, video and colorful content including the use of images. For visually challenged users, screen reader softwares which read and interpret text on a screen cannot read images and this causes lot of inconveniences to users of screen reader softwares. Users having cognitive disabilities include users having problems related to memory, problem-solving, attention, visual comprehension etc. Challenges faced by people having cognitive disabilities include, getting distracted by scrolling text, blinking icons or multiple pop-ups on a webpage, inability of people having visual comprehension difficulties in correlating photograph of a person with representation of the person, inability of a person with problem solving difficulties in navigating webpages with bad links etc. The accessibility challenges get intensified for web applications with interactive information sharing such as Web 2.0 applications because for such applications, users tend to be content producers and may not be able to produce accessible content.

To deal with the various challenges faced by users with disabilities, several standards and best practices have been developed to enable a web designer to make accessible web pages. The World Wide Web Consortium (W3C) is an international standards organization that regularly publishes web accessibility guidelines for web designers to design web accessible content. However, for the considerable volume of web pages already existing on the Internet, the task of manually accessing the web pages and making changes to them according to the web accessibility guidelines is a cumbersome process. Further, the cost of employing skilled web designers to access web pages and point out non-adherence to standards as per W3C is very high.

Based on the above mentioned limitations, there is a need for an automated system and method for assessing websites and for suggesting remedies for issues related with website accessibility.

SUMMARY OF THE INVENTION

A method and system for assessing and remedying accessibility of websites is provided. In various embodiments of the present invention, the system includes a user interface configured to receive address of website to be assessed and an accessibility guideline from a user. Further, the system includes a web crawler configured to crawl the website to extract one or more HTML elements and an application server configured to run accessibility assessment scans on the website. Finally, the system includes a reporting module configured to present one or more accessibility assessment reports. In an embodiment of the present invention, the user interface is also configured to receive level of assessment to be performed on the website by a user and to illustrate status of currently running accessibility scans and completed scans on a real time basis.

In an exemplary embodiment of the present invention, the accessibility assessment is offered as an Internet service. In another exemplary embodiment, the accessibility assessment is offered as an Intranet service. In yet another embodiment, the accessibility assessment is offered as an offline service. In yet another embodiment, the accessibility assessment is provided in a SaaS mode.

In an exemplary embodiment of the present invention, the address of website is a URL of a website hosted online on a web server and accessible through a TCP/IP network. In another exemplary embodiment, the address of website is location of an HTML document stored in the local file system.

The system of the present invention may also include a report builder configured to generate at least one of a PDF summary report, a PDF detailed report, an HTML summary report, an HTML detailed report and an HTML overlay report.

Further, the system of the present invention includes a rules builder and rules engine configured to construct and store rules derived from the one or more accessibility parameters. Further, the system includes a best practices repository configured to store HTML coding standards and a domain specific intelligence module configured to store data related to website patterns from industry specific verticals. In an example, the industry specific verticals are at least one of retail industry, financial services industry and insurance industry.

In an embodiment of the present invention, the method includes receiving address of website to be assessed for accessibility, an accessibility guideline and level of assessment to be performed. Further the method includes crawling the website for extracting information and scanning the website for checking conformance to one or more accessibility parameters.

In various embodiments of the present invention, the method includes providing assessment reports to the user. The assessment reports include a PDF summary report, a PDF detailed report, an HTML summary report, an HTML detailed report and an HTML overlay report.

BRIEF DESCRIPTION OF THE ACCOMPANYING DRAWINGS

The present invention is described by way of embodiments illustrated in the accompanying drawings wherein:

FIGS. 6 and 7 are screenshots illustrating user interfaces for depicting status of currently running accessibility scans.

FIG. 8 is a screenshot illustrating a user interface for depicting status of completed scans.

FIG. 9 is a screenshot illustrating two sections of a PDF summary report of accessibility assessment corresponding to a website scan, in accordance with an embodiment of the present invention.

FIG. 10 is a screenshot illustrating a section of a PDF summary report of accessibility assessment specifying details about scanned HTML elements.

FIG. 14 is a screenshot illustrating an HTML detailed report of accessibility assessment.

DETAILED DESCRIPTION OF THE INVENTION

A method and system for assessing and remedying accessibility of websites is described herein. The present invention is an automated system and method that provides a web-based interface to a user for receiving address of a website, type of accessibility guideline to be used and level of assessment to be performed on the website. In addition to providing web accessibility assessment reports to a user, the system also suggests remedial measures that can be implemented in order to render a website accessible. In an exemplary embodiment, the system of the invention may be delivered to a customer, such as an organization in a Software as a Service (SaaS) mode. The organization may use the service to make one or more of their websites accessible.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
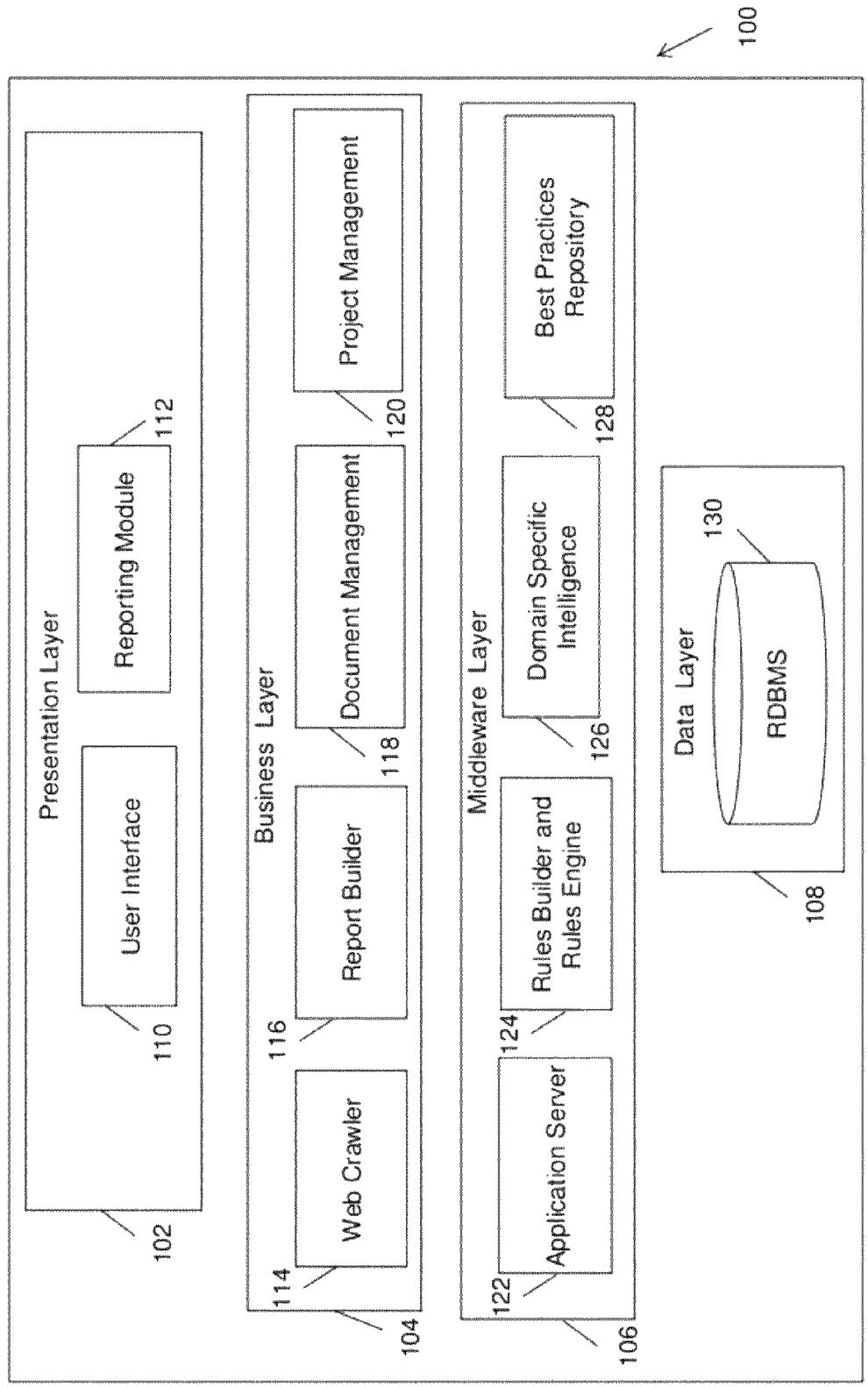
FIG. 1 illustrates an architectural diagram of a web accessibility assessment and remediation engine, in accordance with various embodiments of the present invention.

FIG. 1 illustrates an architectural diagram of a web accessibility assessment and remediation engine, in accordance with various embodiments of the present invention. The system of the invention is a keyword based crawler that scans through all web pages of website or part of a website, identifies features of one or more webpages that do not meet one or more predefined accessibility guidelines, and intelligently suggests measures to be taken to enhance the webpage's accessibility.

In various embodiments of the present invention, the architecture of the web accessibility assessment and remediation engine comprises a presentation layer 102, a business layer 104, a middleware layer 106 and a data layer 108. The presentation layer 102 comprises a user interface 110 and a reporting module 112. The user interface 110 is an interface arranged for receiving information from a user that is required to assess the accessibility of websites. The information received includes address of website to be assessed, one or more accessibility guidelines/parameters to be used in website assessment and level of assessment to be performed. In an embodiment of the present invention, website address received from a user is a Uniform Resource Locator (URL) of the website hosted online on a web server and accessible via the Internet or Intranet. In another embodiment of the present invention, the website address received from the user is the location of a webpage stored locally on a computing device in the form of a file. The user interface 110 includes a provision for the user to enter either URL of the website to be assessed or location of a Hyper Text Markup Language (HTML) file that represents a website and is stored in a computing device running the web accessibility assessment and remediation engine.

Figure 3:
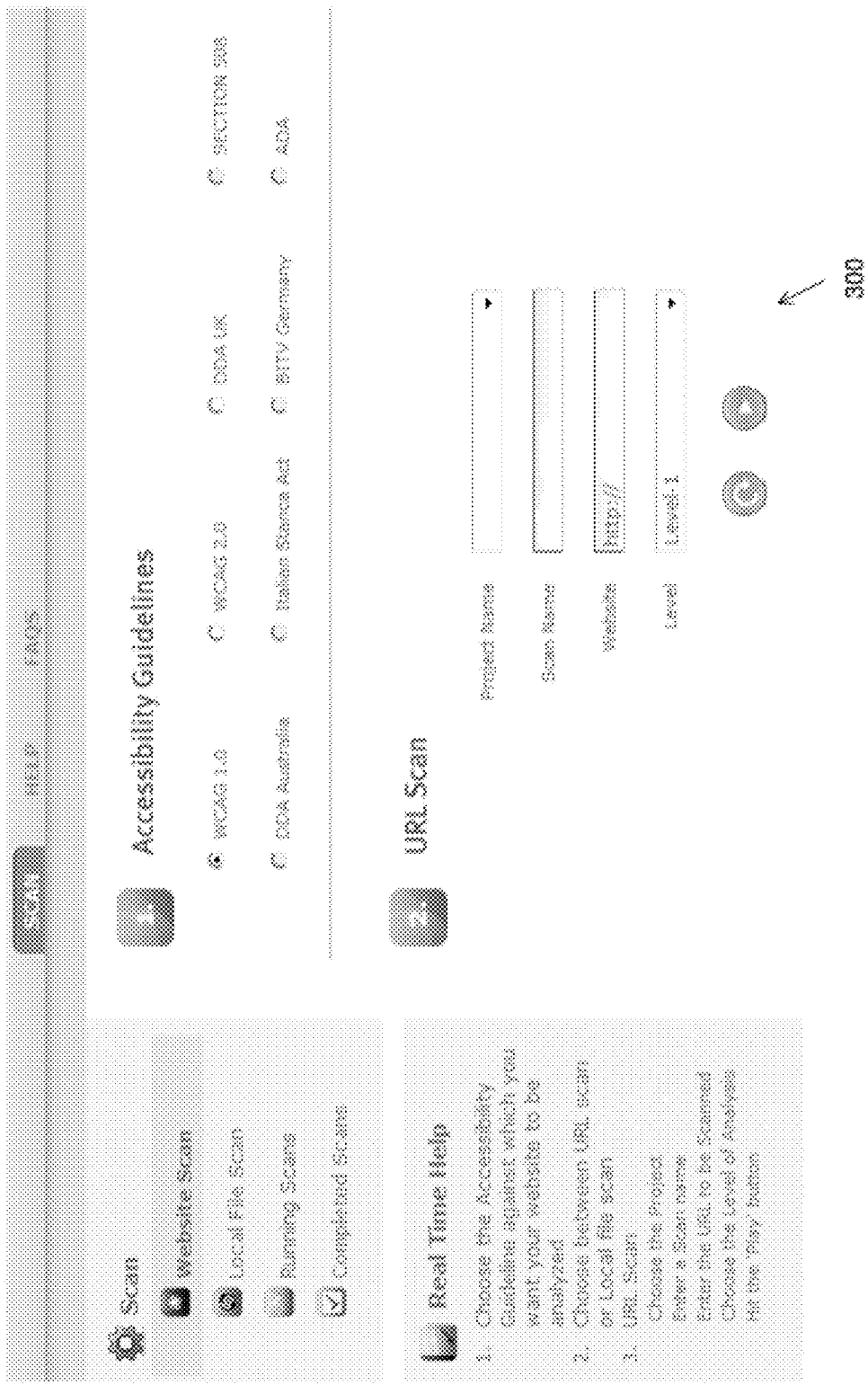
FIG. 3 is a screenshot illustrating a user interface for selecting a guideline for accessibility assessment of a website hosted on a web server, in accordance with an embodiment of the present invention.
Figure 4:
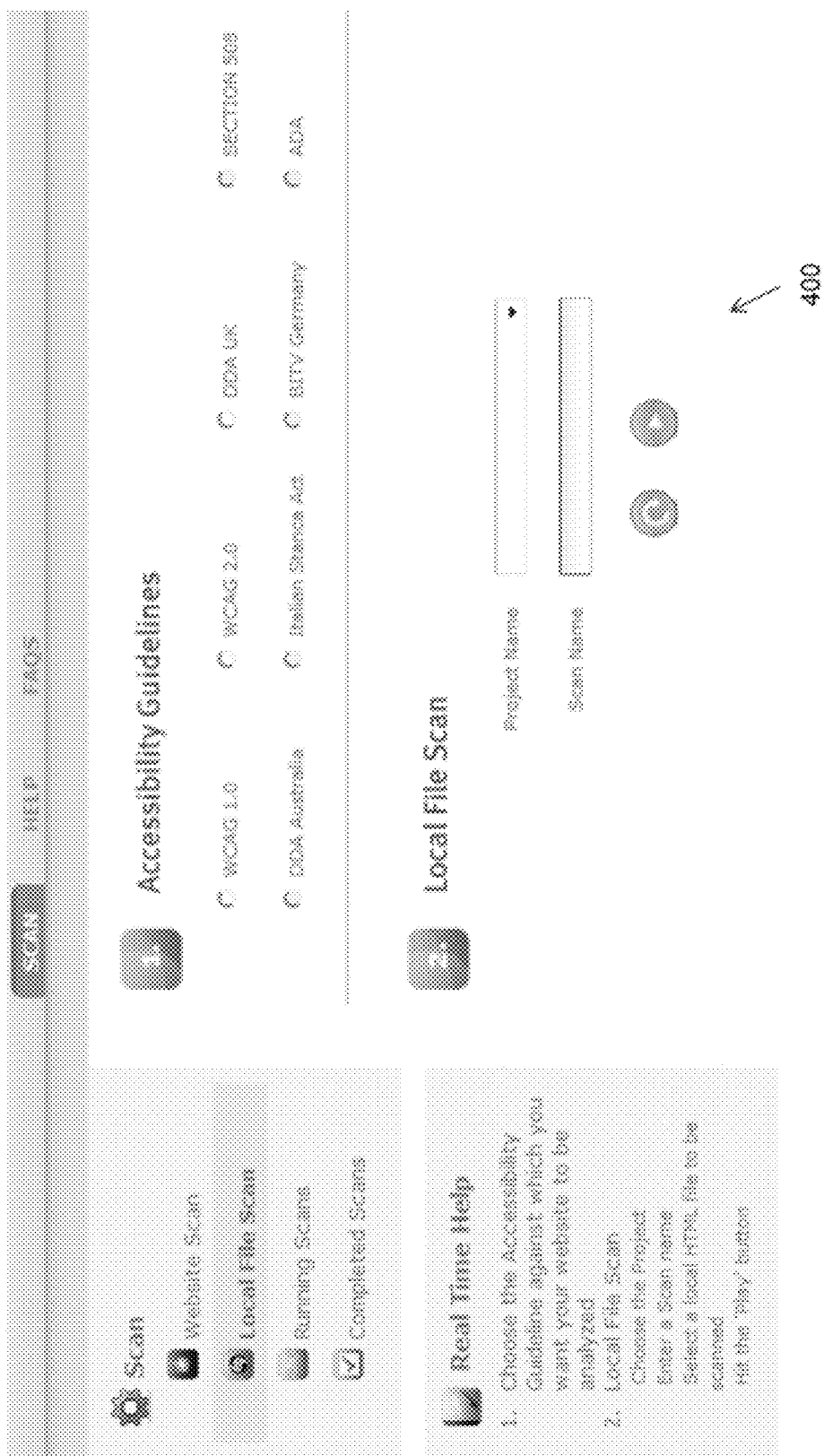
FIGS. 4 and 5 are screenshots illustrating user interfaces for accessibility assessment of an HTML page stored on local file system, in accordance with an embodiment of the present invention.
Figure 5:
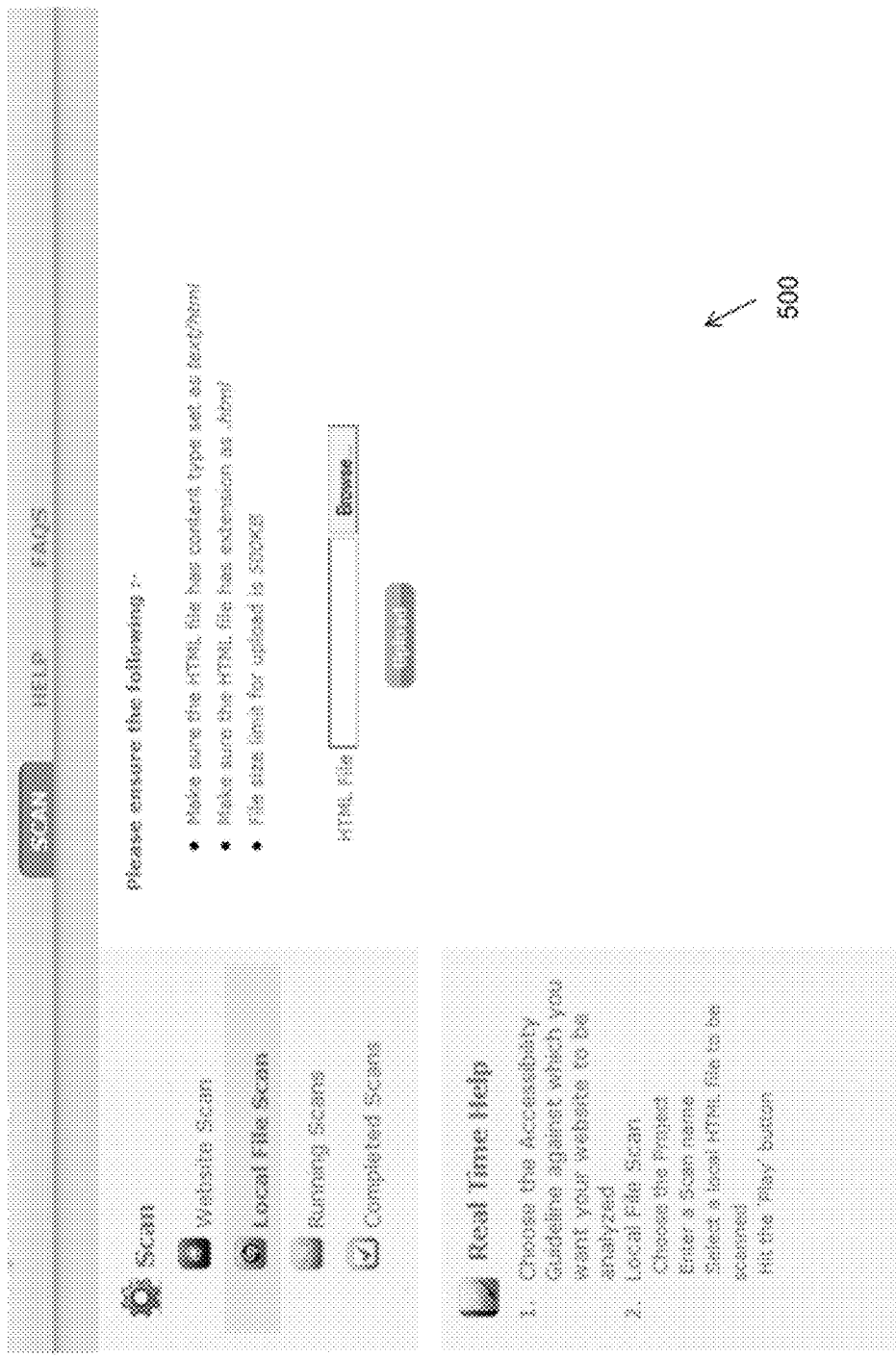

In an embodiment of the present invention, accessibility guidelines are guidelines recommended by World Wide Web Consortium (W3C), an international standards organization, for making web content accessible to various kinds of users. Defining level of assessment by a user includes specifying levels within a website that need to be scanned for assessment. Exemplary screenshots of the user interface 110 in various embodiments are illustrated in FIGS. 3, 4 and 5. In an embodiment of the present invention, the user interface 110 is developed using JavaServer Faces framework.

The reporting module 112 is a software module responsible for providing assessment reports to the user. In various embodiments of the present invention, the reports provided include a Portable Document Format (PDF) summary report, a PDF detailed report, a Hypertext Markup Language (HTML) report and an HTML overlay report. The PDF summary report and PDF detailed reports are PDF reports containing results obtained from accessibility assessment performed on a given website. The HTML report and HTML overlay reports are easy to view HTML reports illustrating results of accessibility assessment that are easily accessible by screen readers. A screen reader is a software application that identifies information displayed on a screen and presents the information to a user using text-to-speech sound icons, a Braille output device etc. Screen readers are useful tools for a person having visual disabilities to access information on a screen.

The business layer 104 comprises a web crawler 114, a report builder 116, a document management module 118 and a project management module 120. The web crawler 114 is a software program that crawls a website that has been selected for assessment, for extracting website related information. In an embodiment of the present invention, the website related information includes HTML tags used in designing a webpage and mandatory fields on the webpage. In an embodiment of the present invention, the web crawler is an open source web crawler. The HTML tags are compared against rules and recommendations governed by web accessibility guidelines to conduct an assessment of accessibility. The report builder 116 is configured to generate reports provided in the reporting module 112. In an embodiment of the present invention, the web accessibility assessment and remediation engine is a search engine that runs scans through web pages of a website. The scanning is executed based on keywords used for common HTML elements and associated contextual semantic content to determine features that do not meet accessibility guidelines. Based on the scans, the report builder 116 generates assessment reports. The document management module 118 is a software system for managing reports generated by the report builder 116. In an embodiment of the present invention, the document management module 118 creates a filesystem, assigns tags to scans in the list of scans and stores reports in a database. The project management module 120 is a module which is configured to simultaneously manage multiple website accessibility assessment projects. The project management module 120 plans and monitors running of scans, generating reports, validation of website HTML tags against rules and accessibility guidelines etc.

The middleware layer 106 comprises an application server 122, a rules builder and rules engine 124, domain specific intelligence module 126 and best practices repository 128. The application server 122 is configured to receive information entered by a user through the user interface 110. The information which includes website addresses, accessibility parameters and assessment levels is used by the application server 122 for running website scans. The rules builder and rules engine 124 constructs and stores rules derived from accessibility parameters corresponding to an accessibility guideline selected through the user interface 110 that are used by the application server 122 to scan a website for accessibility. In various embodiments of the present invention, the application server 122 checks the HTML elements against rules stored in the rules builder and rules engine 124 for conformance as part of scanning process. The rules builder and rules engine 124 regularly accesses the best practices repository 128 for defining and constructing rules. The best practices repository 128 is a repository containing HTML coding standards incorporated as recommendations for checking website accessibility. In an embodiment of the present invention, the best practices repository is built by analyzing numerous web pages with respect to conformance to web accessibility. The best practices repository, in turn makes use of information from the domain specific intelligence module 126 in order to build a repository of coding standards. Information from domain specific intelligence module 126 includes data related to website patterns from industry specific verticals such as retail, financial services, insurance etc. In an embodiment of the present invention, the domain specific intelligence module 126 is regularly updated with data in real-time.

Figure 2:
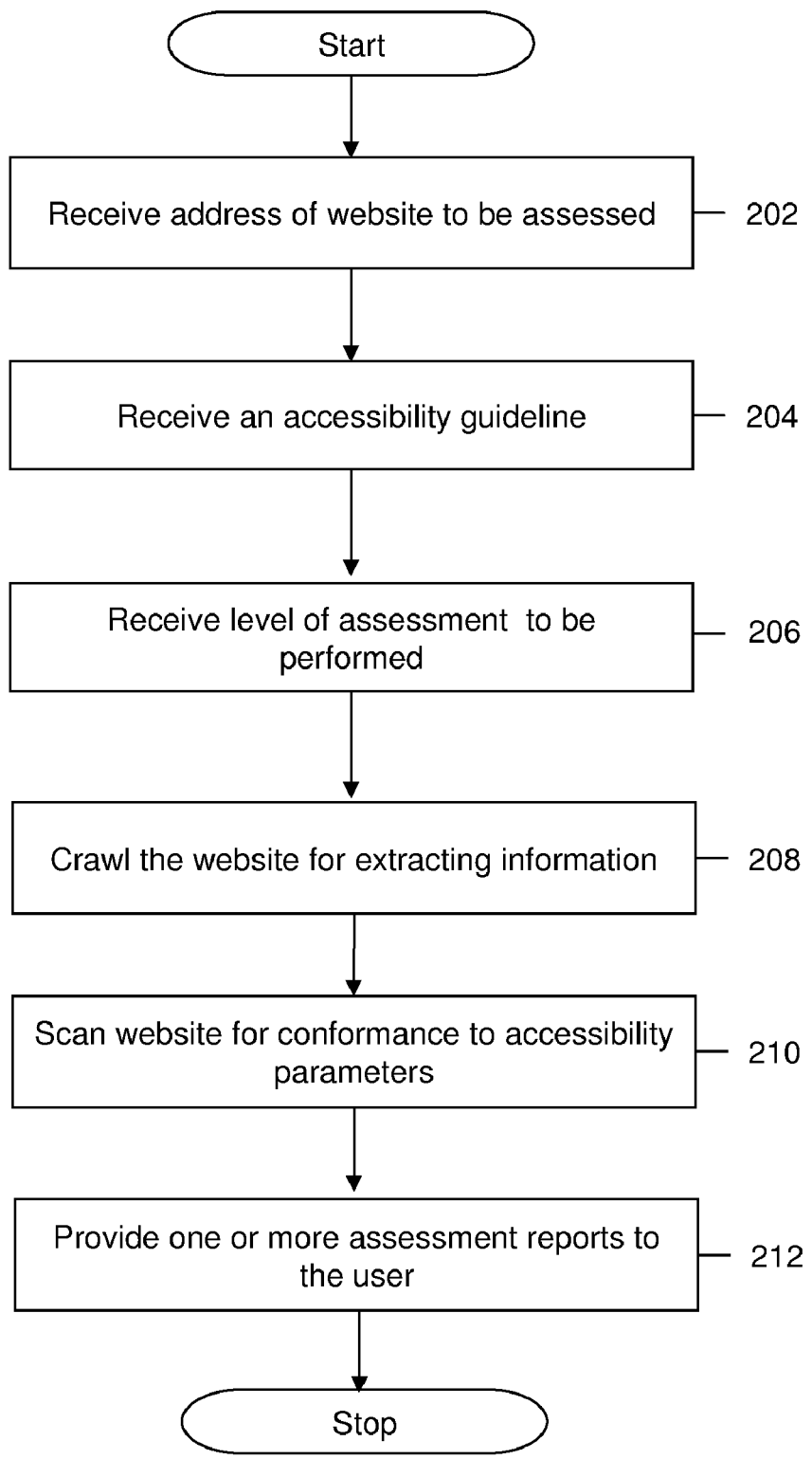
FIG. 2 illustrates a flowchart depicting method steps involved in assessing a website for web accessibility.

FIG. 2 illustrates a flowchart depicting method steps involved in assessing a website for web accessibility. In various embodiments of the present invention, the method for assessing and remedying accessibility of websites for people with disabilities includes reading content of the website to be assessed. The method steps involved in assessing a website include, at step 202, receiving address of website to be assessed. In an embodiment of the present invention, website address received from a user is a Uniform Resource Locator (URL) of the website hosted online on a web server and accessible through an Internet Protocol (IP) network such as the Internet. In another embodiment of the present invention, the website address received from the user is a copy of a webpage stored locally on a computing device in the form of a file. In yet another embodiment of the present invention, the website address received from a user is URL of a website hosted on a server in an Intranet of an organization.

Thereafter, at step 204, the system of the invention receives an accessibility guideline for assessing the website, wherein the accessibility guideline is selected by the user. In an embodiment of the present invention, the accessibility guideline may include one of Web Content Accessibility Guidelines (WCAG) V 1.0, WCAG 2.0, country specific guidelines such as Americans with Disabilities Act, Section 508 of the Rehabilitation Act of USA, Disability Discrimination Act of Australia, Disability Discrimination Act of UK, British Standards Institution's Publicly Available Specification (PAS78) guide to good practice in commissioning accessible websites, EU guidelines as well as number of guidelines from other countries. Each accessibility guideline provides one or more web accessibility parameters or checkpoints for information rendered on a website in order to make the website accessible to one more disability groups. The one or more accessibility parameters include parameters related to design and use of Content (Examples: Audio, Graphics/Video), Comprehension, Presentation (Examples: Text, Color, Tables, Language), Navigation Structure (Site Structure, Links, Forms, Semantic Data, Help), User Controls (Time Limits, Updates, Focus), Technology Alternatives (Frames, JavaScript, CSS) etc. For example, with respect to accessibility parameters related to Content, according to guideline 1.1 of WCAG 2.0, text alternatives for non-text content should be provided so that it can be changed into other forms that people need, such as large print, braille, speech, symbols or simpler language. Similarly, for web accessibility parameters related to Presentation, WCAG 2.0 specifies guidelines for making web content easily distinguishable to users including use of color, audio control, contrast ratio for visual presentation of text and images of text etc.

At step 206, the system receives level of assessment to be performed for a website. In an embodiment of the present invention, the level of assessment is defined by a user. The "home page" of a given website is considered level 1. The links present on the "home page" lead to a level 2 scan. Further, links on level 2 webpages will lead to a level 3 scan and so on. In an embodiment of the present invention, the system of the present invention provides an ability to select upto 6 levels of scan.

At step 208, a web crawler crawls the website selected by the user in order to extract HTML tags. Thereafter, at step 210, the website is scanned for conformance to accessibility parameters. In an embodiment of the present invention, the system of the invention executes a scan based on keywords used for the most common HTML elements, thereby resulting in a faster scan.

FIG. 3 illustrates a user interface 300 for selecting a guideline for accessibility assessment of a website hosted on a web server, in accordance with an embodiment of the present invention. In an embodiment of the present invention, the system and method of the present invention permits a user to run two types of scans, i.e. a website scan and a local file scan. As shown in the figure, the user interface 300 allows users to run an accessibility assessment scan on a website by entering name of the website. Further, the user interface 300 also allows the user to select an accessibility guideline for website assessment. An accessibility guideline is used to assess the website against suggestions stated in the guideline. The suggestions stated in the guidelines are checkpoints related to one or more HTML elements which ensure website accessibility. Further, the accessibility guidelines are used to suggest remedies to accessibility problems occurring in the website. In an embodiment of the present invention, the accessibility guidelines available for selection are WCAG 1.0, WCAG 2.0, DDA UK, SECTION 508, DDA Australia, Italian Stanca Act, BITV Germany and ADA. The user interface 300 allows users to specify level of accessibility assessment to be performed on the chosen website. As shown in the figure, a user may identify a scan run on a particular website by entering a name corresponding to the field 'scan name'.

FIGS. 4 and 5 illustrate user interfaces 400 and 500 respectively for accessibility assessment of an HTML page stored on local file system. As shown in the figures, the user interface provides options for a user to select at least one accessibility guideline, a project name, a scan name and location of an HTML file that is to be scanned. Upon entering of the above information by a user, the system runs an accessibility assessment scan on the chosen HTML file based on the accessibility guideline selected.

Figure 6:
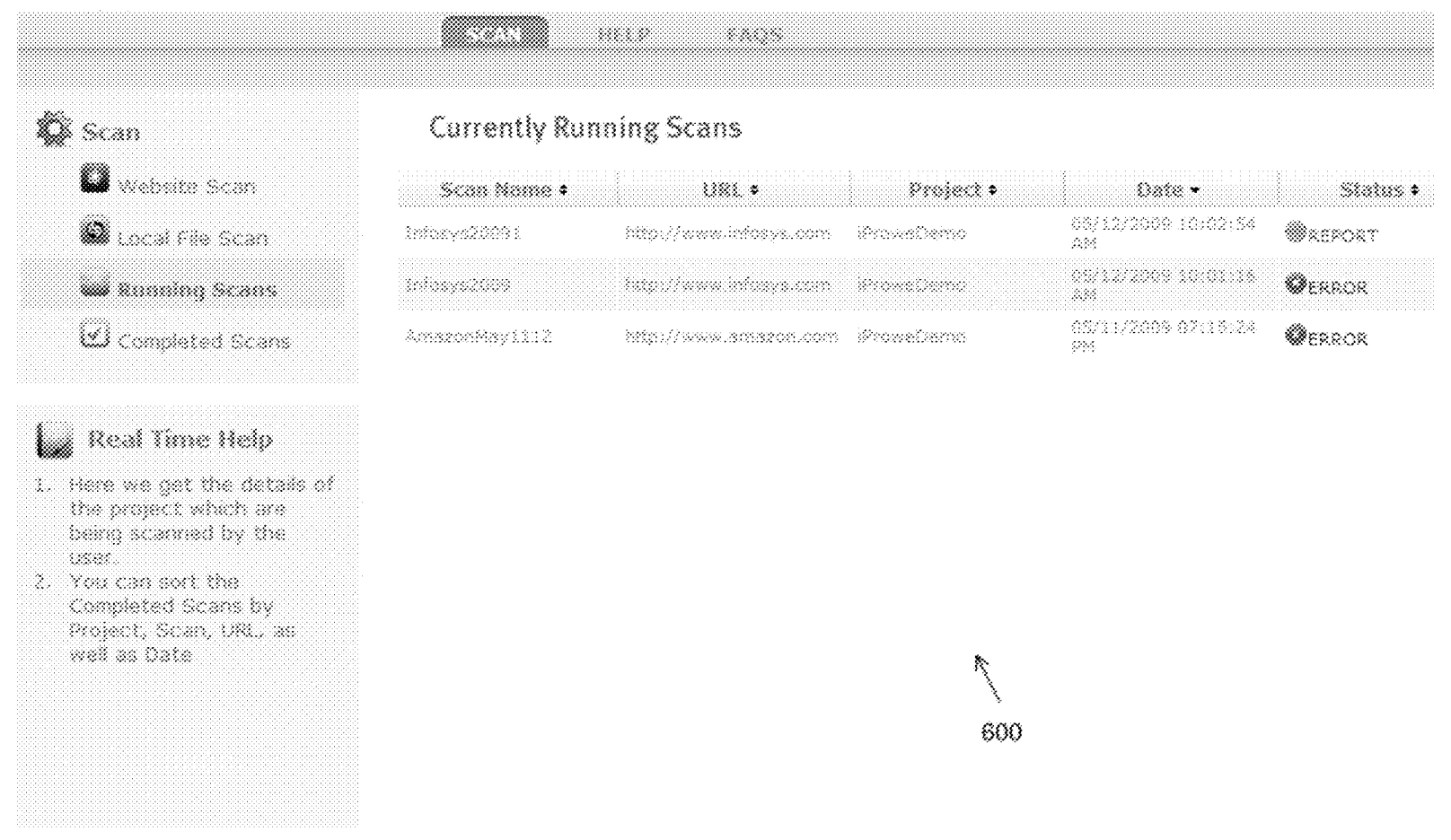
Figure 7:
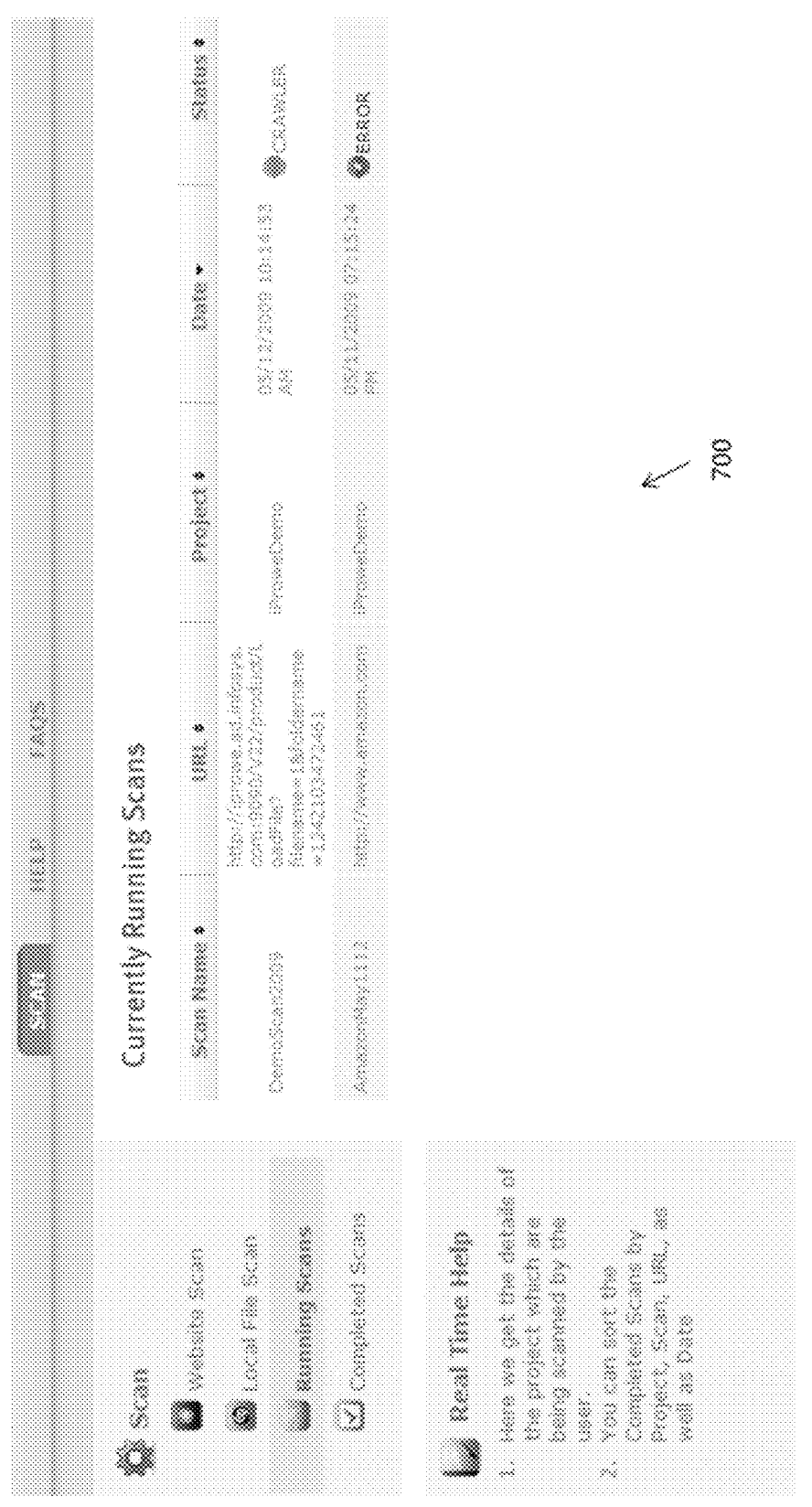

FIGS. 6 and 7 illustrate user interfaces 600 and 700 respectively for depicting status of currently running accessibility scans, in accordance with an embodiment of the present invention. The user interface depicted in FIG. 6 is a 'Currently Running Scans page' which is displayed by clicking of the 'Running Scans' tab. The 'Currently Running Scans page' shows status of scans that are currently being executed by the system and method of the invention. In an embodiment of the present invention, the sections displayed in the 'Currently Running Scans page' include scan name identifying a running scan, URL indicating the URL currently being scanned, Project Name, Date displaying date of start of scan and Status displaying status of the scan. In an embodiment of the present invention, the stages that occur in the progress of a scan are as follows: 1) User Interface, 2) Analysis 3) Crawler and 4) Report. During the user interface stage, a user enters 'type of scan' to be run i.e. either a website scan or a local file scan, URL of a website, location of a file, level of assessment, accessibility guidelines etc. In the Crawler stage, a web crawler crawls the website for extracting HTML elements. Finally, the extracted HTML elements are compared with accessibility guidelines and one or more accessibility assessment reports are generated.

Figure 8:
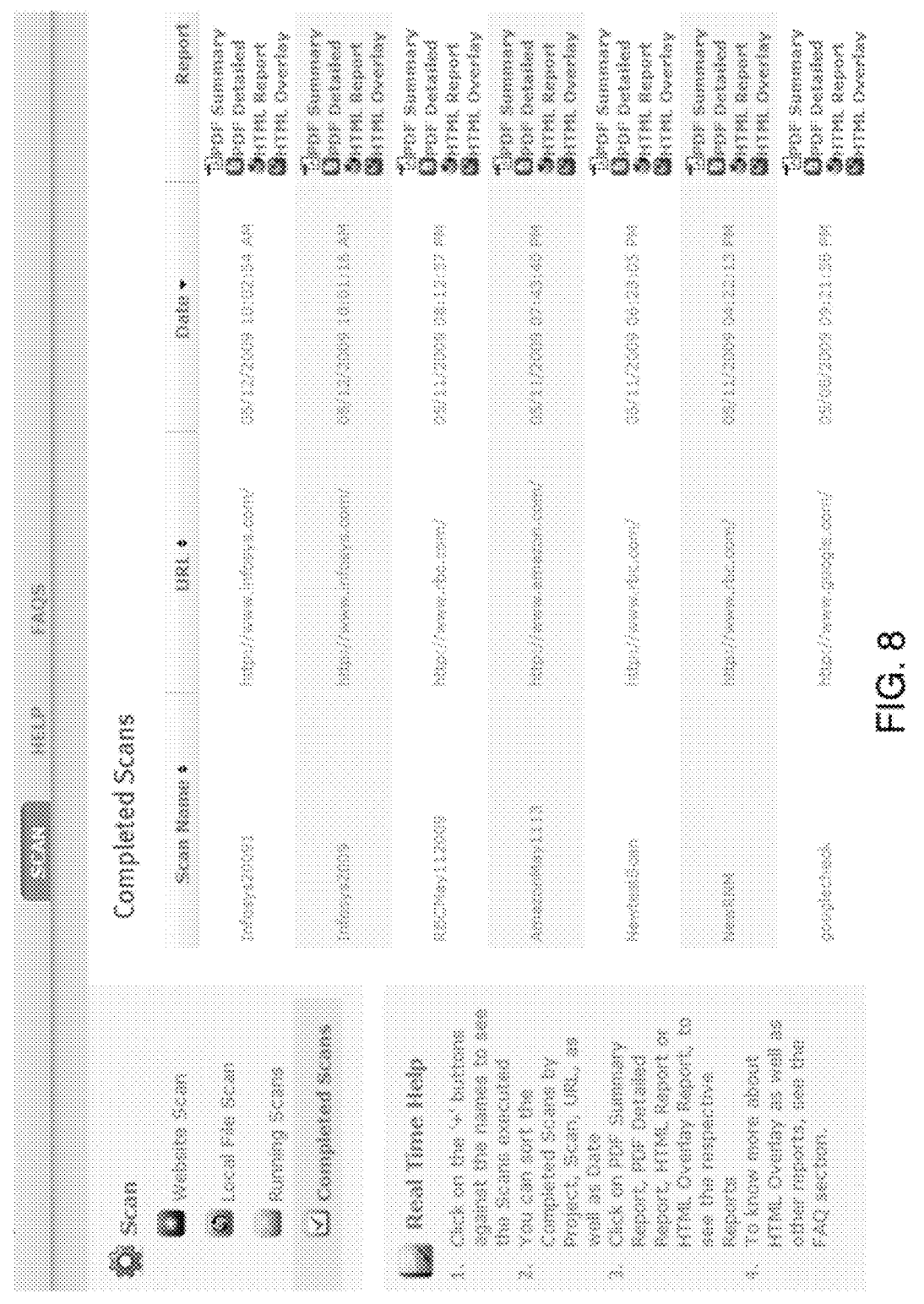

FIG. 8 illustrates a user interface for depicting status of completed scans. In an embodiment of the present invention, the details regarding scans that have been completed and for which various reports in different formats have been generated can be seen by clicking on the 'Completed Scans' section of the user interface.

Figure 9:
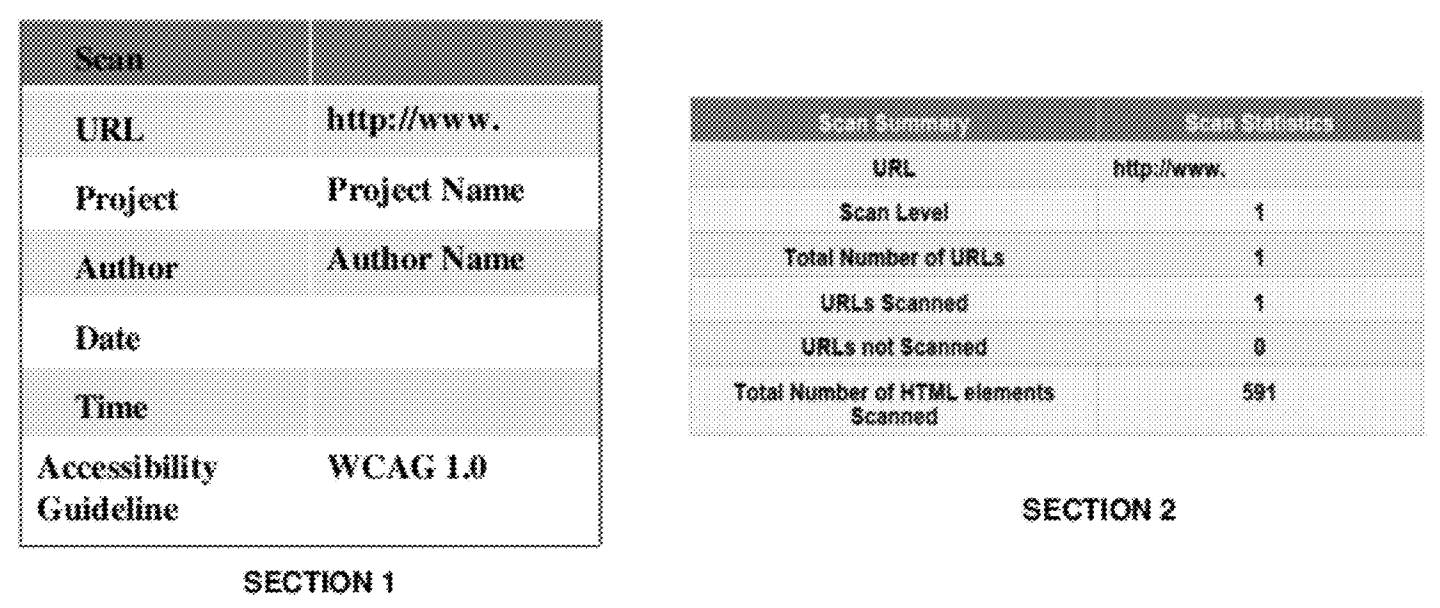

FIG. 9 illustrates two sections of a PDF summary report of accessibility assessment corresponding to a website scan, in accordance with an embodiment of the present invention. As shown in the figure, Section 1 of the PDF summary report is a table illustrating high level statistics corresponding to the scan. In an embodiment of the present invention, Section 1 includes information on project name, URL of website that has been assessed, guideline used for website assessment (e.g. WCAG 1.0 and date/time when assessment was performed. Section 2 of the PDF summary report is a table illustrating further details on a scanned website. In an embodiment of the present invention, the details include total number of URLs scanned, URLs not included in the scan and total number of HTML elements scanned. In various embodiments of the present invention, the HTML elements may include, but not limited to, HTML tags such as <TITLE>, <BODY>, <BR>, <HEAD>, <link>, etc.

FIG. 10 illustrates a section of PDF summary report of accessibility assessment specifying details about scanned HTML elements. As illustrated in the figure, the section shows type of HTML element scanned and number of breakpoints for each HTML element. In an example, type of HTML element scanned may include elements such as 'Input', 'Select', 'Anchor', 'Image' etc. Breakpoints are stop points in a scan that represent HTML elements not conforming to accessibility assessment guidelines. The section also illustrates number of breakpoints in each priority level corresponding to each HTML element. In an embodiment of the present invention, a priority level is assigned to each 'HTML element' breakpoint from the priority levels 1, 2, and 3. The priority levels are assigned based on recommendations of working group of WCAG. Each priority level for an HTML element indicates degree of conformance required by that HTML element in order for the element to be accessible to one or more disability groups. According to WCAG standards, priority level 1 is considered more critical with respect to website accessibility than priority level 2, and priority level 2 is more critical than priority level 3.

Figure 11:
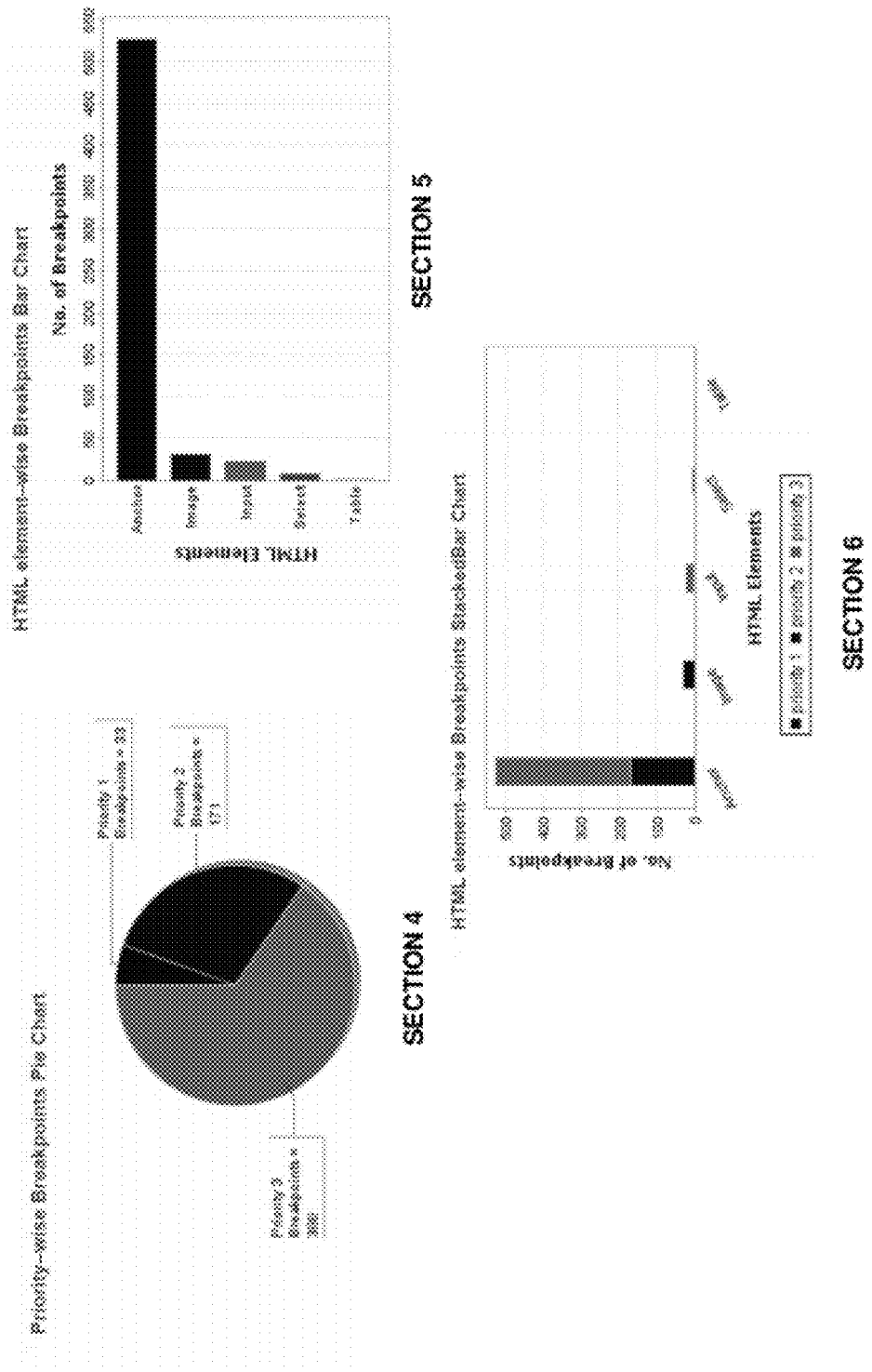
FIG. 11 is a screenshot showing sections of PDF summary report of accessibility assessment illustrating charts for comparing accessibility issues of HTML elements.

FIG. 11 shows sections of PDF summary report of accessibility assessment illustrating charts for comparing accessibility issues of HTML elements. Section 4 is a breakpoints pie chart graphically illustrating number of breakpoints in each priority level whereas section 5 is a breakpoints bar chart graphically illustrating number of breakpoints for each HTML element. As shown in the figure, section 6 is a breakpoints stacked bar chart graphically illustrating number of breakpoints for each HTML element.

Figure 12:
FIG. 12 is a screenshot illustrating an HTML summary report of accessibility assessment, in accordance with an embodiment of the present invention.

FIG. 12 illustrates an HTML summary report 1200 of accessibility assessment, in accordance with an embodiment of the present invention. An HTML summary report is an easy to view report illustrating results of scan in HTML format. The HTML report is easily accessible by a screen reader. The HTML summary report includes information about project details such as name of project, URL scanned, date and time of start of scan and accessibility guideline used for scan. As shown in the figure, in an example, the accessibility guideline used for the scan is WCAG 1.0. Further, the HTML summary report includes a 'Summary Statistics' section and a 'HTML element-wise errors' section. The 'Summary Statistics' section provides the following information: main URL of the website that is scanned, assessment level of the scan, number of URLs scanned for the website scan, number of URLs not scanned and total number of HTML elements/tags scanned. The 'HTML element-wise errors' section displays type of HTML element scanned and number of breakpoints for each HTML element. In an example, type of HTML element scanned may include elements such as 'Input', 'Select', 'Anchor', 'Image' etc. The section also illustrates number of breakpoints in each priority level corresponding to each HTML element.

Figure 13:
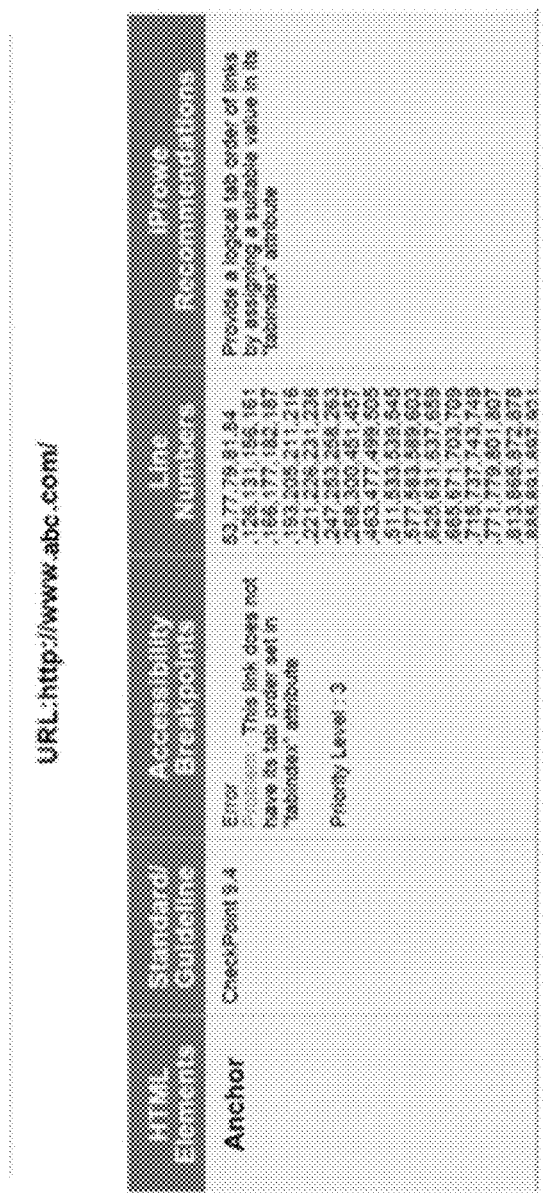
FIG. 13 is a screenshot illustrating a section from a PDF detailed report of accessibility assessment.

FIG. 13 illustrates a section from a detailed report of accessibility assessment in PDF format. In an embodiment of the present invention, a PDF detailed report is an elaborate report of accessibility assessment performed on a given website The PDF detailed report consists of information available in the PDF summary report in addition to detailed information on a page by page assessment of the accessibility challenges. The detailed report consists of a table of information where, the first column lists the HTML element assessed. Examples of HTML elements assessed may include, but are not limited to, anchor, images, tables, forms etc. The second column provides reference to the guideline that is used to assess for conformance. Further, the third column provides details of the accessibility break-point for each of the element and the fourth column lists the actual line number where a particular element occurs in the source code. In an embodiment, the fifth column provides recommendations based on the guidelines chosen. As shown in the figure, for the HTML element 'Anchor', the 'Accessibility Breakpoint' indicates that the 'Anchor' element does not satisfy the accessibility standard 'Checkpoint 9.4' of WCAG 2.0. According to WCAG 2.0, checkpoint 9.4 is a priority level 3 accessibility guideline that instructs the creation of a logical tab order of links by assigning a suitable value in its 'tabindex' attribute. In the figure, the column 3 'Accessibility Breakpoints' states the error that the element 'Anchor' does not have its tab order set in 'tabindex' attribute. Column 4 lists the line numbers where the element 'Anchor' does not have its tab order set and the Column 5 provides recommendation for conforming to the guideline.

The PDF detailed report is a consolidated page-by-page report having a report page for each URL scanned. In an exemplary embodiment, the recommendation format of the system of the invention may provide more than one recommendation for every error encountered. Providing multiple recommendations may assist in creating options for error correction.

Figure 14:
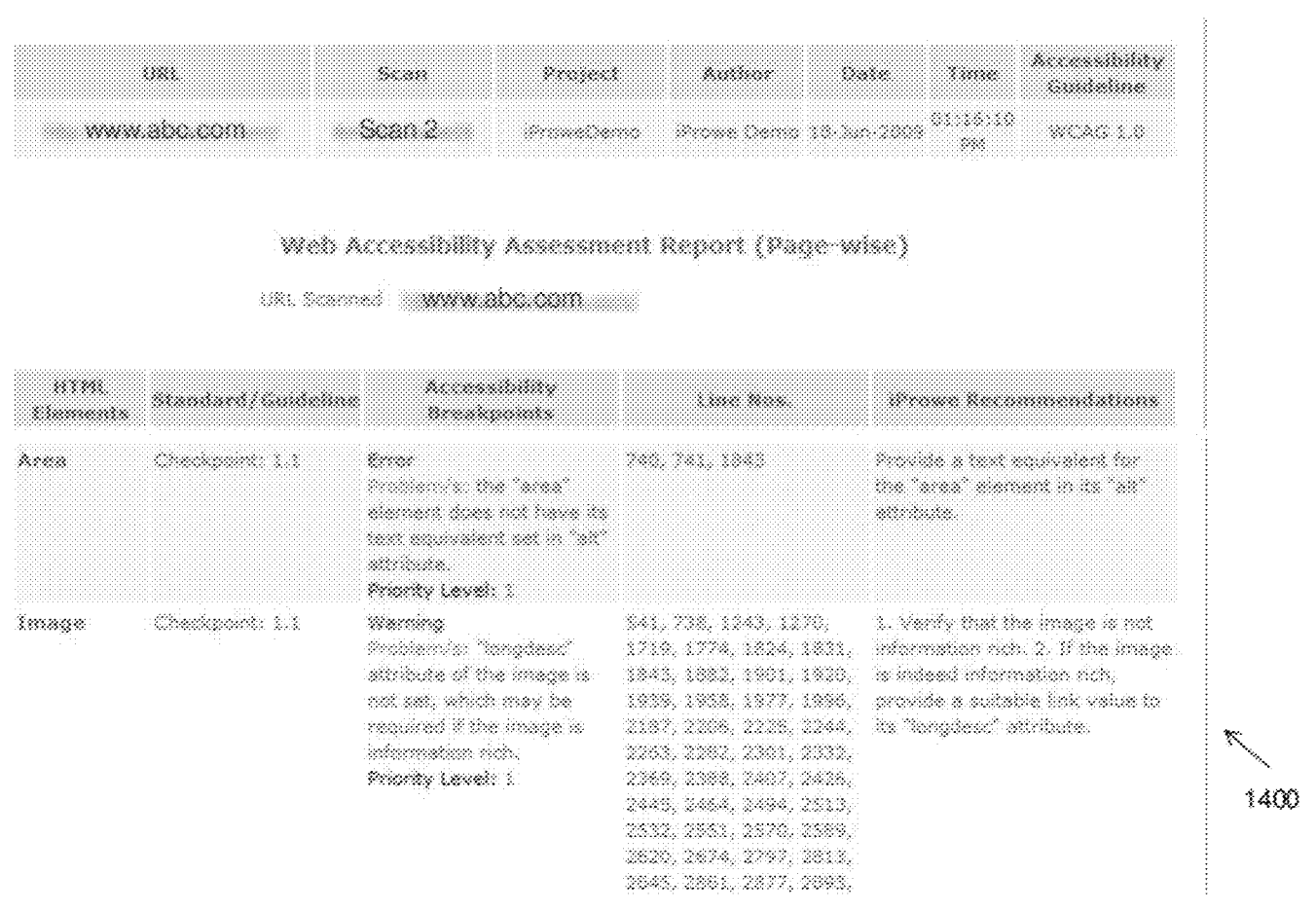

FIG. 14 illustrates an HTML detailed report 1400 of accessibility assessment. As shown in the figure, corresponding to each HTML element, the report states problem associated with the element along with the standard/guideline that is being flouted. Further, recommendation for overcoming the problem is listed in column 5.

In an embodiment of the present invention, the system categorizes the problem associated with the HTML element either as an error, a warning or as an alert.

Figure 15:
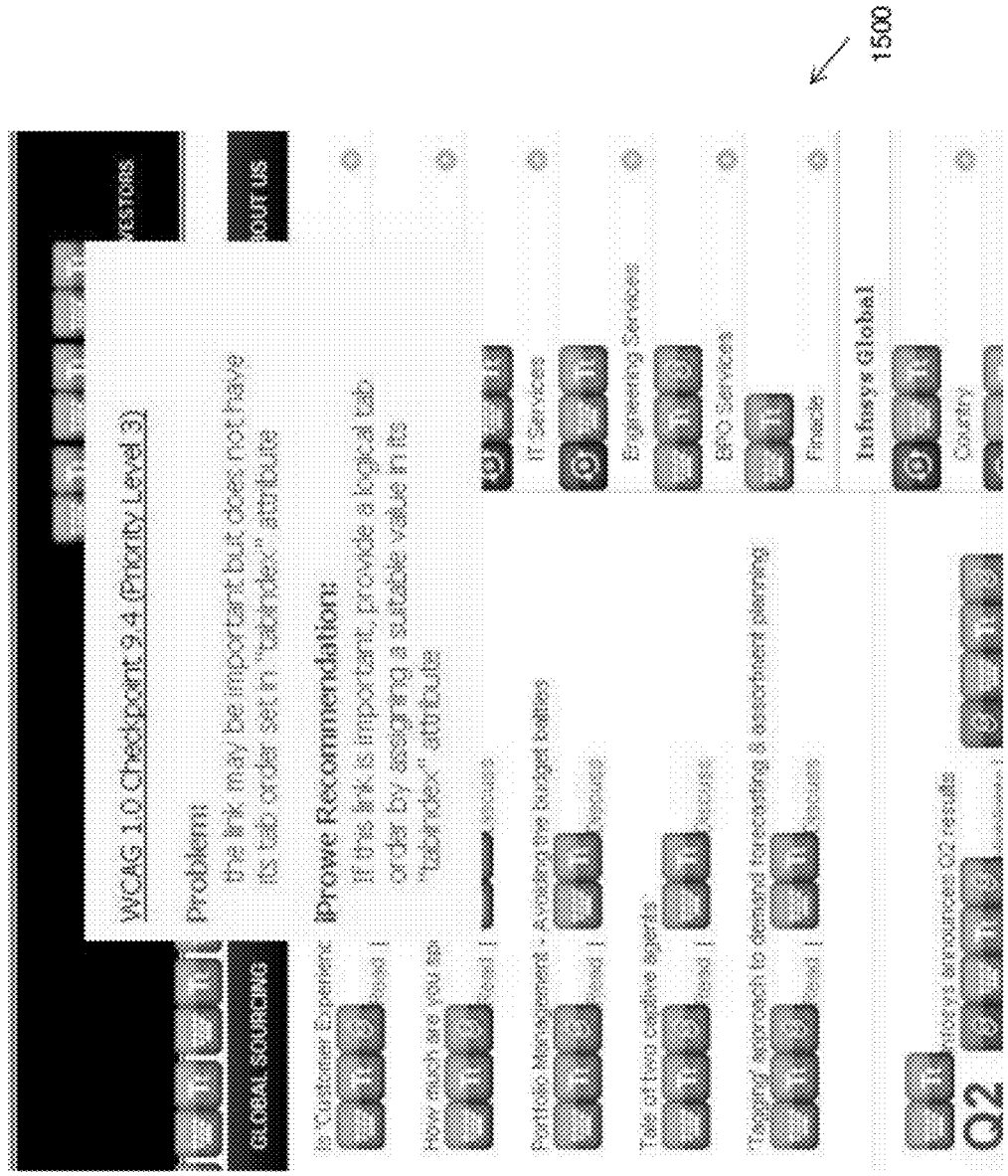
FIG. 15 is a screenshot illustrating an HTML overlay report of accessibility assessment.

FIG. 15 illustrates an HTML overlay report 1500 of accessibility assessment. The HTML overlay report is an easy to view report for identifying accessibility challenges in a webpage. In an embodiment of the present invention, the HTML overlay report loads a website/webpage that has been assessed. Thereafter, a report interface is overlayed on top of the HTML page providing a visual representation in the form of small icons for each HTML element that has an error. The user may point a mouse to an error icon for more details about recommendations on resolving the error.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A system for assessing and remedying accessibility of a website, the system comprising:
   a computing device;
   a user interface configured to receive an address of a website to be assessed and further configured to receive an accessibility guideline from a user via the computing device, wherein the accessibility guideline comprises one or more accessibility parameters;
   a domain specific intelligence module in communication with the computing device and configured to store data, wherein the stored data is obtained by analyzing numerous web pages of websites corresponding to multiple industries;
   a best practices repository in communication with the computing device and configured to store coding standards using the data obtained from the web pages of the websites corresponding to the multiple industries stored in the domain specific intelligence module;
   a rules builder and rules engine in communication with the computing device and configured to construct and store rules derived from the one or more accessibility parameters and coding standards derived from data related to the web pages of the websites corresponding to the multiple industries;
   a web crawler in communication with the computing device and configured to crawl the website to be assessed to extract at least one of: one or more HTML elements and one or more mandatory fields of the website to be assessed;
   an application server in communication with the computing device and configured to run accessibility assessment scans on the website to be assessed based on the stored rules, wherein an accessibility assessment is performed by assessing an accessibility of the extracted one or more HTML elements and the one or more mandatory fields based on stored rules derived from the one or more accessibility parameters and coding standards specific to web pages of the website to be assessed; and
   a reporting module in communication with the computing device and configured to present one or more accessibility assessment reports based on the accessibility assessment, the accessibility assessment reports being stored in a database, wherein the one or more accessibility assessment reports suggest remedies to improve accessibility based on the accessibility assessment.

2. The system of claim 1, wherein the user interface is further configured to receive a level of assessment to be performed on the website by a user.

3. The system of claim 1, wherein the user interface is further configured to illustrate a status of currently running accessibility scans and completed scans on a real time basis.

4. The system of claim 1, wherein the selected accessibility guideline is at least one of WCAG 1.0, WCAG 2.0, ADA, DDA UK, DDA Australia, Section 508, Italian Stanca Act and BITV Germany.

5. The system of claim 1, wherein the accessibility assessment is configured to be performed via the Internet.

6. The system of claim 1, wherein the accessibility assessment is configured to be performed via an Intranet.

7. The system of claim 1, wherein the accessibility assessment is configured to be performed offline.

8. The system of claim 1, wherein the accessibility assessment is provided in a SaaS mode, wherein customers pay for accessibility assessment services based on usage.

9. The system of claim 1, wherein the address of the website is a URL of a website hosted online on a web server and accessible through a TCP/IP network.

10. The system of claim 1, wherein the address of the website is location of an HTML document stored in a local file system.

11. The system of claim 1 further comprising a report builder configured to generate at least one of a PDF summary report, a PDF detailed report, an HTML summary report, an HTML detailed report and an HTML overlay report, and further configured to provide the report to the reporting module for presentation.

12. The system of claim 1, wherein the domain specific intelligence module is configured to store data related to website patterns from industry specific verticals, and the industry specific verticals are at least one of retail industry, financial services industry and insurance industry.

13. A method for assessing and remedying accessibility of a website, the method comprising:
receiving an address of a website to be assessed for accessibility;
receiving an accessibility guideline selected by a user, wherein one or more accessibility parameters are derived from the accessibility guideline;
receiving a level of assessment to be performed, wherein the level of assessment is selected by the user;
receiving data related to web pages of websites corresponding to multiple industry specific websites, wherein the data is obtained based on analysis of website patterns of the multiple industry specific websites;
receiving rules derived from at least one of: the one or more accessibility parameters and coding standards, the coding standards being obtained from the data related to the web pages of the websites corresponding to the multiple industry specific websites;
crawling the website to be assessed for extracting one or more HTML elements and one or more mandatory fields of the website to be assessed;
scanning the website to be assessed for accessibility based on the received rules and the received level of assessment selected by the user, wherein an accessibility assessment is performed for checking conformance of the extracted one or more HTML elements and the one or more mandatory fields to one or more accessibility parameters and coding standards derived from data related to web pages specific to the website to be assessed; and
providing one or more assessment reports to the user, wherein the assessment reports provide errors in the scanned website and remedies for correcting the errors.

14. The method of claim 13, wherein the address of the website is a URL of a website hosted online on a web server and accessible through a TCP/IP network.

15. The method of claim 13, wherein the address of the website is a location of an HTML document stored in a local file system.

16. The method of claim 13, wherein the accessibility guideline selected by the user is at least one of WCAG 1.0, WCAG 2.0, ADA, DDA UK, DDA Australia, Section 508, Italian Stanca Act and BITV Germany.

17. The method of claim 13, wherein providing one or more assessment reports comprises providing at least one of a PDF summary report, a PDF detailed report, an HTML summary report, an HTML detailed report and an HTML overlay report.

18. The method of claim 17, wherein the PDF summary report displays number of errors corresponding to each HTML element, and
the number of errors are further classified with respect to priority levels.

19. The method of claim 17, wherein the PDF detailed report is a page-wise report specifying one or more errors associated with each HTML element and corresponding line numbers where the error occurs.

20. The method of claim 19 further comprising providing a recommendation for remedying the one or more errors associated with each HTML element.

21. The method of claim 17, wherein the HTML overlay report is a report that opens in a separate window on top of an analyzed website and provides a visual representation of errors.

22. The method of claim 21, wherein the HTML overlay report is provided to the user as an Internet service.

23. A computer program product comprising a non-transitory computer usable medium having a computer readable program code embodied therein for assessing and remedying accessibility of a website, the computer program product comprising:
program instruction means for receiving an address of a website to be assessed for accessibility;
program instruction means for receiving an accessibility guideline selected by a user, wherein one or more accessibility parameters are derived from the accessibility guideline;
program instruction means for receiving data related to web pages of websites corresponding to multiple industry specific websites, wherein the data is obtained based on analysis of website patterns of the multiple industry specific websites;
program instruction means for receiving rules derived from at least one of: the one or more accessibility parameters and coding standards, the coding standards being obtained from the data related to the web pages of the websites corresponding to the multiple industry specific websites;
program instruction means for receiving a level of assessment to be performed;
program instruction means for crawling the website to be assessed for extracting one or more HTML elements and one or more mandatory fields of the website to be assessed;
program instruction means for scanning the website to be assessed for accessibility based on the received rules and the received level of assessment selected by the user, wherein the accessibility assessment is performed for checking conformance of the extracted one or more HTML elements and the one or more mandatory fields to one or more accessibility parameters and coding standards derived from data related to web pages specific to the website to be assessed; and
program instruction means for providing one or more assessment reports to the user wherein the one or more assessment reports provide errors in the scanned website and remedies for correcting the errors.

24. The computer program product of claim 23, wherein the program instruction means for providing one or more assessment reports to the user comprises:
program instruction means for providing at least one of a PDF summary report, a PDF detailed report, an HTML summary report, an HTML detailed report and an HTML overlay report.

25. The computer program product of claim 24 further comprising program instruction means for providing a recommendation for remedying one or more errors associated with each HTML element.

26. The system of claim 1, wherein the domain specific intelligence module is configured to store in real time data obtained from the web pages of the websites corresponding to multiple industry specific websites.

27. The system of claim 1, wherein the accessibility assessment reports provide a visual representation of errors in a scanned website and remedies for correcting the errors.

* * * * *